United States Patent
Rhodes et al.

(10) Patent No.: US 10,170,747 B2
(45) Date of Patent: Jan. 1, 2019

(54) TREATED CURRENT COLLECTOR FOIL

(71) Applicant: Ford Global Technologies, LLC, Dearborn, MI (US)

(72) Inventors: Kevin James Rhodes, Dearborn, MI (US); Andrew Robert Drews, Ann Arbor, MI (US); Christopher Michael Seubert, New Hudson, MI (US); Mark Edward Nichols, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1172 days.

(21) Appl. No.: 13/917,758

(22) Filed: Jun. 14, 2013

(65) Prior Publication Data

US 2014/0370377 A1    Dec. 18, 2014

(51) Int. Cl.
| | |
|---|---|
| H01M 4/04 | (2006.01) |
| H01M 4/13 | (2010.01) |
| H01M 4/139 | (2010.01) |
| H01M 4/62 | (2006.01) |
| H01M 4/66 | (2006.01) |

(52) U.S. Cl.
CPC .......... *H01M 4/0404* (2013.01); *H01M 4/13* (2013.01); *H01M 4/139* (2013.01); *H01M 4/622* (2013.01); *H01M 4/661* (2013.01); *H01M 4/0435* (2013.01); *H01M 4/623* (2013.01)

(58) Field of Classification Search
None
See application file for complete search history.

(56) References Cited

U.S. PATENT DOCUMENTS

| | | |
|---|---|---|
| 4,935,317 A | 6/1990 | Fauteux et al. |
| 5,464,707 A | 11/1995 | Moulton et al. |
| 5,520,850 A | 5/1996 | Chaloner-Gill et al. |
| 5,846,674 A | 12/1998 | Sakai et al. |
| 6,007,588 A | 12/1999 | Mitchell |

(Continued)

FOREIGN PATENT DOCUMENTS

| | | |
|---|---|---|
| JP | 05135759 A | 6/1993 |
| JP | 11238411 A | 8/1999 |

(Continued)

OTHER PUBLICATIONS

P. Verma et al., "A review of the features and analyses of the solid electrolyte interphase in Li-ion batteries", Electrochimica Acta, Jun. 1, 2010, pp. 6332-6341, vol. 55.

(Continued)

*Primary Examiner* — Carmen V Lyles-Irving
(74) *Attorney, Agent, or Firm* — James Dottavio; Brooks Kushman P.C.

(57) ABSTRACT

In at least one embodiment, a battery is provided comprising an electron beam-treated current collector having an increased surface energy compared to an untreated current collector and an electrode disposed on a treated surface of the current collector. The electrode may include a water-soluble binder uniformly coating a surface of the current collector and the treated current collector may have a contact angle with the water-soluble binder of 70 degrees or less. The electron beam treatment may be applied to a moving current collector foil as part of a battery production process, prior to application of an electrode slurry.

12 Claims, 2 Drawing Sheets

(56) References Cited

U.S. PATENT DOCUMENTS

| | | |
|---|---|---|
| 6,521,381 B1 | 2/2003 | Vyas et al. |
| 6,887,511 B1 | 5/2005 | Shima et al. |
| 7,851,238 B2 | 12/2010 | Mitchell et al. |
| 8,202,649 B2 | 6/2012 | Visco et al. |
| 2001/0037558 A1 | 11/2001 | Karasawa et al. |
| 2003/0027040 A1 | 2/2003 | Asahina et al. |
| 2008/0248189 A1 | 10/2008 | Ohtsuka et al. |
| 2008/0248212 A1* | 10/2008 | Muggli et al. ............... 427/496 |
| 2008/0248388 A1 | 10/2008 | Ohtsuka et al. |
| 2009/0274955 A1* | 11/2009 | Kikuchi et al. ............... 429/144 |
| 2009/0325071 A1 | 12/2009 | Verbrugge et al. |
| 2010/0015514 A1 | 1/2010 | Miyagi et al. |
| 2010/0173098 A1 | 7/2010 | Nagata et al. |
| 2010/0261801 A1* | 10/2010 | Weiss et al. .................... 521/27 |
| 2011/0076563 A1 | 3/2011 | Nagata et al. |
| 2011/0272786 A1* | 11/2011 | Besling ............... H01M 4/0423 257/534 |
| 2012/0135304 A1 | 5/2012 | Uchida et al. |
| 2013/0008217 A1* | 1/2013 | Hosoe .................... H01M 4/04 72/46 |
| 2013/0029206 A1* | 1/2013 | Lev ............................... 429/161 |
| 2013/0108776 A1* | 5/2013 | Li et al. ............................ 427/8 |
| 2013/0115413 A1* | 5/2013 | Eres ........................ G01N 21/01 428/120 |

FOREIGN PATENT DOCUMENTS

| | | |
|---|---|---|
| JP | 2004273132 A | 9/2004 |
| JP | 2008041347 A | 2/2008 |
| WO | 2008103118 A1 | 8/2008 |
| WO | 2010128681 A1 | 11/2010 |

OTHER PUBLICATIONS

D. Choi et al., "LiMnPO4 Nanoplate Grown via Solid-State Reaction in Molten Hydrocarbon for Li-Ion Battery Cathode", Nano Letters, Jul. 19, 2010, pp. 2799-2805, vol. 10.

G. Schiller, "Progress in Metal-Supported Solid Oxide Fuel Cells", International Symposium on Energy Materials: Opportunities and Challenges (ISEM-2011), Mar. 1, 2011, 41 pages.

* cited by examiner

US 10,170,747 B2

TREATED CURRENT COLLECTOR FOIL

TECHNICAL FIELD

One or more embodiments relate to a treated current collector foil for use in a battery.

BACKGROUND

Enhancement of battery performance is an important issue in the advancement of portable electronics, power grid regulation, and electric vehicles. Rechargeable or secondary batteries generally include positive and negative electrodes, a separator, and an electrolyte. Current collectors are typically attached to each electrode in order to extract current from the battery. A common battery production method includes preparing a slurry of active material mixed with conductive carbon and binder with solvent and spreading it on metal current collectors and drying the slurry. Rechargeable batteries are often cycled repeatedly, which may result in swelling.

SUMMARY

In at least one embodiment, a battery is provided comprising an electron beam-treated current collector having an increased surface energy compared to an untreated current collector and an electrode disposed on a treated surface of the current collector. The electrode may include a water-soluble binder, for example, carboxymethylcellulose (CMC), Xantham gum, or polyvinyl alcohol (PVA). In one embodiment, the binder forms chemical bonds with hydroxyl groups on the treated surface of the current collector. In another embodiment, the current collector has a contact angle with water-soluble binders of 70 degrees or less. The current collector may be a metal foil formed of copper or aluminum.

In at least one embodiment, a method of forming a battery electrode is provided comprising treating a surface of a current collector with an electron beam, applying a slurry including electrode active material and binder to the treated surface, and drying the slurry to form a battery electrode. The current collector may be a metal foil. In one embodiment, the treating step includes passing the metal foil under the electron beam, the electron beam being emitted from a stationary source. The metal foil may be passed under the electron beam at a speed of 10 to 100 feet per minute. In one embodiment, the metal foil is passed under the electron beam two or more times. In another embodiment, the electron beam is set to a radiation level of 10 to 200 kGy. The electron beam may have an application voltage of 50 to 200 kV. Two opposing surfaces of the current collector may be treated with the electron beam. In one embodiment, the binder is a water-soluble binder, for example, carboxymethylcellulose (CMC), Xantham gum, or polyvinyl alcohol (PVA). The treating step may be performed under ambient conditions and/or at 65 to 75° F.

In at least one embodiment, a battery is provided comprising a current collector metal foil and an electrode including a water-soluble binder uniformly coating a surface of the current collector metal foil. The current collector metal foil may have a contact angle with water-soluble binders of 70 degrees or less.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
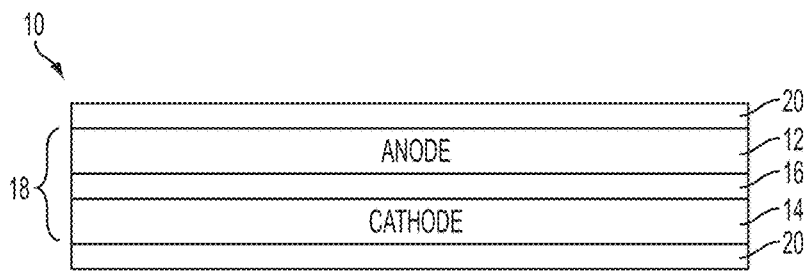
FIG. 1 is a schematic drawing of a lithium-ion battery.

With reference to FIG. 1, a typical battery 10 is shown, which may be a rechargeable battery (e.g., a lithium-ion battery). The battery 10 includes a negative electrode (anode) 12, a positive electrode (cathode) 14, a separator 16, and an electrolyte 18 disposed within the electrodes 12, 14 and separator 16. However, the battery 10 may include additional components or may not require all the components shown, depending on the battery type or configuration. In addition, a current collector 20 may be disposed on one or both of the anode 12 and cathode 14. In at least one embodiment, the current collector 20 is a metal foil. In one embodiment, the current collector 20 is formed of aluminum or copper. Examples of other suitable metal foils may include, but are not limited to, stainless steel, nickel, gold, or titanium.

Electrode production may include casting a slurry 22 onto a current collector 20 and drying the slurry to form an electrode 12 and/or 14. The slurry 22 may include active material, conductive material, binder, and/or solvent. During this operation, it is important that the composite slurry 22 spread evenly onto the current collector 20 during casting to ensure a uniform electrode. This can be challenging with some materials that may form slurries with poor wettability onto current collector foils. If integrity of the electrode-current collector interface is compromised through repeated cycling and swelling, the interfacial resistance may increase and portions of the active materials may become isolated, leading to capacity fade. Methods for improving the wetting and adhesion of the composite electrode to the current collector surface are needed. One of the fundamental issues in developing a high performance cell is ensuring a strong and long-lasting bond between the current collector 20 and the composite electrode layer that is applied to it.

In at least one embodiment, as treated current collector 20 is provided having increased wetting and adhesion with the electrode 12, 14 compared to an untreated current collector. In one embodiment, the current collector 20 is treated using an electron beam treatment. The electron beam treatment may be carried out under atmospheric or ambient conditions, which may mean that the target surface is not in a vacuum and/or that the target surface is in air (e.g., is not maintained in an inert gas such as argon or nitrogen). The treatment may also be carried out at around room temperature (e.g., about 65-75° F.).

Electron beam treatment may generally be performed using an electron beam apparatus, or source, including an electron gun to generate and accelerate a primary electron beam and a magnetic optical system to control the way in which the electron beam impinges on the current collector. The gun cathode is the source of the electrons that are accelerated and shaped into a beam by an electrostatic field geometry established by the gun electrode. The electron beam then exits the gun assembly through a hole in the anode with an energy equal to the value of the negative high voltage (gun operating voltage) being applied to the cathode. After exiting the gun, the beam passes through an electromagnetic lens and deflection coil system. The lens produces either a focused or defocused beam spot on the current collector, while the deflection coil is used to either position the beam spot on a stationary location or provide some form of oscillatory motion. In at least one embodiment, the electron beam oscillates (or rasters) across a width of a moving current collector foil roll after it is unrolled and before a slurry is cast thereon. While the preceding description is one possible configuration for applying an electron beam treatment to the current collector, any suitable configuration may be used.

Figure 2:
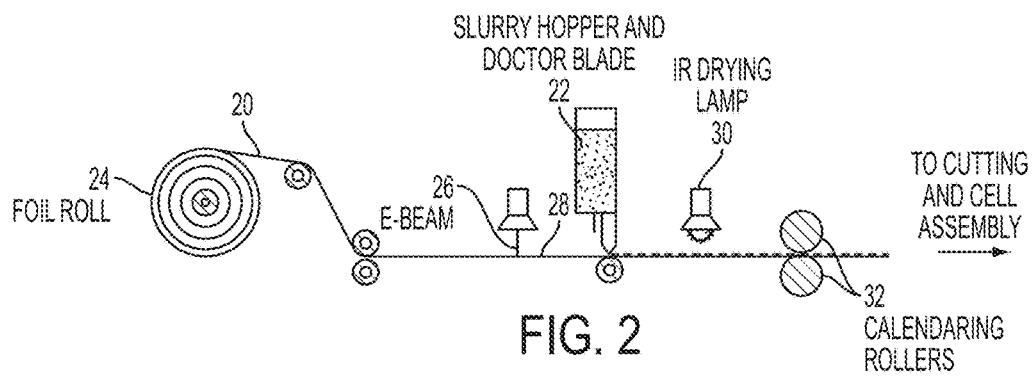
FIG. 2 is an embodiment of a production assembly line for an electrode having an electron beam-treated current collector.

With reference to FIG. 2, in at least one embodiment, the treatment may be incorporated into the production process of an electrode 12, 14. A roll 24 of metal foil may be unrolled and continuously passed under an electron beam 26, which is emitted from a stationary source. The electron beam-treated surface 28 of the current collector 20 is then coated with a slurry 22, which may include active material, conductive material, binder, and solvent. A dryer 30, for example an infrared (IR) drying lamp may then dry the slurry to form an electrode 12, 14. Rollers 32, for example, calendaring rollers, may optionally be present to smooth the electrode after it has dried. The formed electrode and current collector assembly may then be cut and assembled with other components into battery cells. While FIG. 2 shows electron beam treatment and slurry coating on one surface of the current collector 20, both surfaces may be treated and coated.

Figure 3:
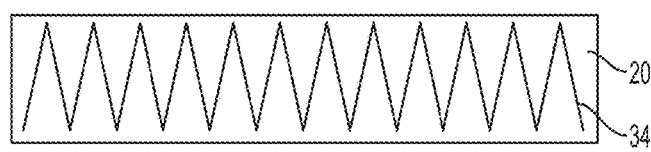
FIG. 3 is a schematic drawing of an electron beam path on a moving current collector according to one embodiment.

In embodiments where the current collector foil 20 is moving past an oscillating electron beam 26, the beam may form a triangular wave pattern 34 on the foil due to the linear movement of the foil, as shown in FIG. 3. For a fixed oscillation rate of the beam 26, the triangular wave will widen for faster foil movement and narrow for slower foil movement. Alternatively, for a fixed foil movement speed, a faster beam oscillation will narrow the triangular wave pattern and a slower oscillation will widen the wave pattern.

The dosage of radiation absorbed by the current collector 20 may be adjusted by controlling the parameters of the electron beam apparatus. In at least one embodiment, the electron beam is set to a radiation level of 5 to 300 kGy, wherein the radiation level is the amount of radiation absorbed by air. In another embodiment, the electron beam is set to a radiation level of 10 to 200 kGy. In another embodiment, the electron beam is set to a radiation level of 20 to 175 kGy. In another embodiment, the electron beam is set to a radiation level of 25 to 150 kGy. In another embodiment, the electron beam is set to a radiation level of 30 to 100 kGy. In another embodiment, the electron beam is set to a radiation level of 35 to 75 kGy. In embodiments where the current collector is unrolled and passed under at least one electron beam, the speed of the conveyor advancing the collector foil may be configured to allow for the desired amount of radiation. In one embodiment, the conveyor speed (e.g., the linear speed of the foil) is from 10 to 100 feet per minute. In another embodiment, the conveyor speed is from 25 to 75 feet per minute. In another embodiment, the conveyor speed is about 50 feet per minute. These conveyor speeds are non-limiting examples, however, and the conveyor speed can be set to any suitable value for the target radiation dosage.

The current collector may be cycled through the electron beam apparatus a single time (one pass) or multiple times (multiple passes). Alternatively, multiple electron beams may be positioned in series such that multiple passes are done in one linear motion. In one embodiment, a single pass is done. In another embodiment, 2 or more passes are done, for example, 2, 3, 4, or 5 passes. If multiple passes are done, then the total dosage of radiation absorbed by the current collector is the sum of the radiation from each pass. For example, if the electron beam apparatus delivers 50 kGy per pass and two passes are done, then the total radiation delivered will be 100 kGy. In at least one embodiment, the application voltage of the electron beam apparatus is from 50 to 200 kV. In another embodiment, the application voltage is from 75 to 175 kV. In another embodiment, the application voltage is from 100 to 150 kV. In another embodiment, the application voltage is about 125 kV. It should be understood that the above electron beam treatment parameters are non-limiting, and parameters outside the stated ranges are still within the scope of the electron beam treatment.

While not wishing to be held to any particular theory, it is believed that the electron beam treatment described above may increase the surface energy of the treated surface 28 of the current collector 20, which may enhance or increase the chemical bonding of the current collector 20 to the binder in the slurry 22. Increased chemical bonding may increase uniformity of the slurry 22 on the current collector 20, increase the adhesion of the dried electrode 12, 14 to the current collector 20, and reduce de-wetting of the electrode 12, 14. One way in which the surface energy of the current collector 20 may be increased is by the reaction of oxygen and nitrogen radicals with the current collector surface, forming polar functional groups. The polar functional groups may include hydroxyl groups, amine groups, or others. These polar functional groups may then engage in hydrogen bonding with oxygen, nitrogen, or fluorine in the electrode binder.

Figure 4:
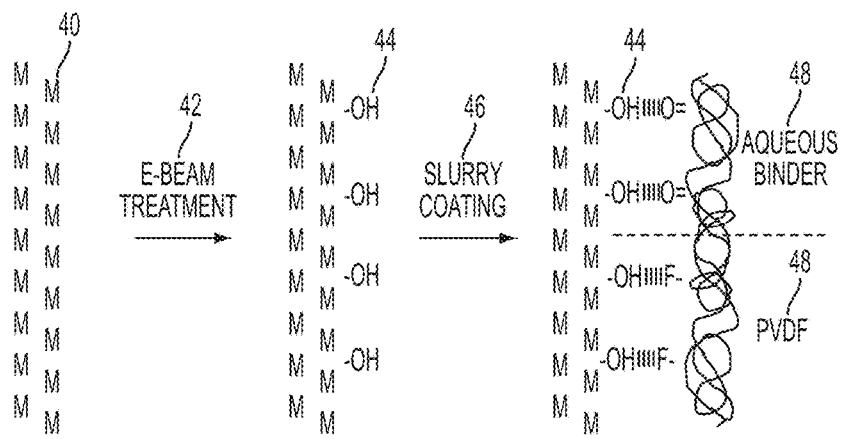
FIG. 4 is a schematic drawing of an electron beam treatment and subsequent bonding of a current collector with a binder.

With reference to FIG. 4, an embodiment of the electron beam treatment and its method of operation are shown. A metal surface 40 of the current collector 20 is treated with an electron beam treatment 42. As a result, polar functional groups 44 are formed on the surface 40, shown in FIG. 4 as hydroxyl groups (OH). A slurry coating 46 is then applied to the surface 40, for example by casting. A binder 48 present in the slurry may then engage in hydrogen bonding with the polar functional groups 44. In at least one embodiment, the binder 48 is a non-aqueous binder (e.g., non-water soluble), for example, polyvinylidene fluoride (PVDF). As shown in FIG. 4, the fluorine in the PVDF may engage in hydrogen bonding with the hydrogen in the hydroxyl group attached to the metal surface 40. In another embodiment, the binder 48 is an aqueous binder (e.g., water-soluble), for example, one or more of carboxymethyl cellulose (CMC), Xantham gum, and polyvinyl alcohol (PVA). As shown in FIG. 4, the oxygen in the aqueous binder may engage in hydrogen bonding with the hydroxyl group attached to the metal surface 40.

The higher surface energy and increased hydrogen bonding of the electron beam-treated current collector results in a lower contact angle between the slurry 22 and the current collector 20. Untreated copper foils generally have a contact angle with water-soluble binders of over 80 degrees. In one embodiment, copper foils which have undergone an electron beam treatment have a contact angle with water-soluble binders of 70 degrees or less. In another embodiment, electron beam-treated copper foils have a contact angle with water-soluble binders of 60 degrees or less. In another embodiment, electron beam-treated copper foils have a contact angle with water-soluble binders of 55 degrees or less. In another embodiment, electron beam-treated copper foils have a contact angle with water-soluble binders of 50 degrees or less. In another embodiment, electron beam-treated copper foils have a contact angle with water-soluble binders of from 30 to 70 degrees. In another embodiment, electron beam-treated copper foils have a contact angle with water-soluble binders of 40 to 60 degrees.

PVDF is currently the standard binder material used in Li-ion batteries. However, water-soluble binders such as CMC, Xantham gum, and PVA may be possible replacements for PVDF. Water-soluble binders offer several advantages over non-soluble binders, for example, they may reduce cost, lower VOC emissions, improve safety during manufacturing, and greatly improve recycling characteristics. Water-soluble binders may only be viable if the adhesion and de-wetting with current collectors are improved. Electron beam treatment of current collectors, as described in one or more embodiments above, may increase the surface energy of current collectors such that electrodes including water-soluble binders may be uniformly coated onto the treated surface of the current collector (e.g., a metal foil). Without the treatment, water-soluble binders have too poor adhesion and de-wetting to form a uniform film on a metal foil. Electron beam treatment improves the adhesion and de-wetting properties of water-soluble binders coated on metal foils such that the electrodes are acceptable and the water-soluble binders may become more commercially viable.

Electron beam treatment of current collectors is relatively low cost and fast, such that it may be incorporated into the current assembly process of lithium-ion batteries. Existing slot-die casting machinery currently used for large scale composite electrode fabrication may still be used in conjunction with the electron beam treatment, avoiding significant additional costs or changes to the electrode production process. Electron beam treatment has additional advantages over other potential treatment methods, for example, it does not produce or use toxic, hazardous or flammable materials and it can be configured to produce a uniform treatment over a large area, including continuous treatment of foil passing through the electron beam. Moreover, electron beam treatment is instantly applied, is persistent in its effect, and it does not require the use, handling or disposal of chemicals.

EXAMPLES

Figures 5A, 5B:
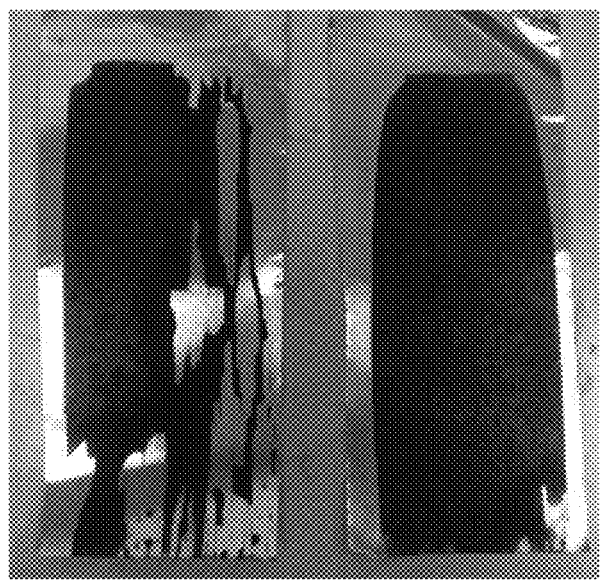
FIG. 5A is a photograph of a dried slurry including a carboxymethylcellulose binder cast onto an untreated copper foil current collector.
FIG. 5B is a photograph of a dried slurry including a carboxymethylcellulose binder cast onto an electron beam-treated copper foil current collector.

With reference to FIGS. 5A and 5B, casting of a slurry including a CMC binder is shown on a copper foil current collector without (FIG. 5A) and with (FIG. 5B) an electron beam treatment, according to one embodiment. The electron beam treatment was performed at an application voltage of 125 kV and a conveyor speed of 50 feet per minute in standard atmosphere. The radiation dosage was 50 kGy. The current collector with the electron beam treatment shows a significant improvement in film uniformity and surface wetting compared to the untreated current collector. The slurry coated on the untreated current collector shows extensive de-wetting and non-uniformity, with significant portions of the current collector completely uncoated. In contrast, the slurry coated on the treated current collector shows a uniform coating with good surface wetting.

Figure 6:
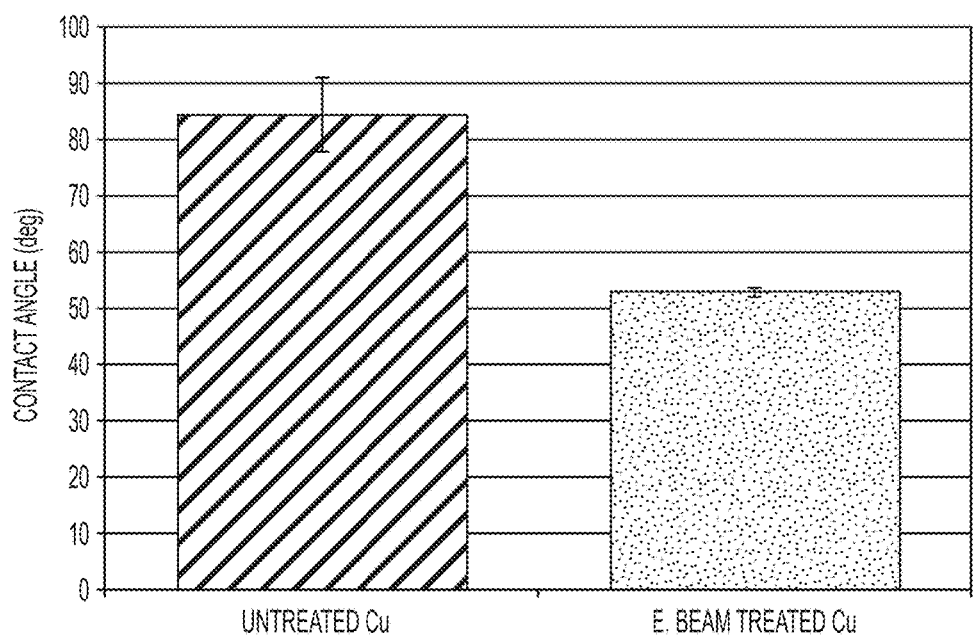
FIG. 6 is a graph showing the contact angle of untreated copper foil current collectors and electron beam-treated copper foil current collectors with a slurry including a carboxymethylcellulose binder.

With reference to FIG. 6, the contact angle between copper foil current collectors and deionized water for untreated and treated copper foils is shown (the treated copper foil was treated similar to the foil of FIG. 5B). The contact angle was measured using a sessile drop method, with a droplet size of 1-3 μL. Five measurements were taken for each surface, using a Ramé-Hart Instruments Contact Angle Goniometer, model 100-00. For the untreated copper foils, the contact angle had an average of about 84 degrees. For the treated copper foils, the average contact angle was about 53 degrees. A lower contact angle indicates a higher surface energy; therefore the significantly reduced contact angle of the treated copper foil shows that the surface energy of the treated foil is significantly higher.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of treating a current collector, comprising:
   unrolling a roll of a metal current collector and passing it under a stationary electron beam source;
   continuously treating a surface of the unrolled metal current collector with an electron beam in air to increase its surface energy;
   applying a slurry including a binder to the treated surface; and
   drying the slurry.

2. The method of claim 1, wherein the current collector is a metal foil.

3. The method of claim 1, wherein the unrolled metal current collector is passed under the electron beam at a speed of 10 to 100 feet per minute.

4. The method of claim 1, wherein the unrolled metal current collector is passed under an electron beam two or more times.

5. The method of claim 1, wherein the electron beam is set to a radiation level of 10 to 200 kGy.

6. The method of claim 1, wherein the electron beam has an application voltage of 50 to 200 kV.

7. The method of claim 1, wherein two opposing surfaces of the current collector are treated with an electron beam.

8. The method of claim 1, wherein the binder is a water-soluble binder.

9. The method of claim 8, wherein the binder is carboxymethylcellulose (CMC), Xantham gum, or polyvinyl alcohol (PVA).

10. The method of claim 1, wherein the treating step is performed under ambient conditions.

11. The method of claim 1, wherein the treating step is performed at 65 to 75° F.

12. The method of claim 1, wherein treating the surface of the unrolled metal current collector with the electron beam includes oscillating the electron beam to form a triangular wave pattern on the current collector.

* * * * *